United States Patent

[11] 3,603,158

| | | |
|---|---|---|
| [72] | Inventor | Erwin Schlitz<br>Heusenstamm, Germany |
| [21] | Appl. No. | 816,740 |
| [22] | Filed | Apr. 16, 1969 |
| [45] | Patented | Sept. 7, 1971 |
| [73] | Assignee | International Telephone and Telegraph Corporation<br>New York, N.Y. |
| [32] | Priority | Apr. 22, 1968 |
| [33] | | Germany |
| [31] | | P 17 55 285.1 |

[54] ANGULAR ACCELERATION SENSOR
1 Claim, 2 Drawing Figs.

| | | |
|---|---|---|
| [52] | U.S. Cl. | 73/515 |
| [51] | Int. Cl. | G01p 15/02 |
| [50] | Field of Search | 73/514, 515, 516, 505, 502 |

[56] References Cited
UNITED STATES PATENTS

| 3,051,884 | 8/1962 | Cook | 73/516 |
|---|---|---|---|
| 3,098,393 | 7/1963 | Cook | 73/516 |
| 3,131,565 | 5/1964 | Amlie | 73/516 |
| 3,347,103 | 10/1967 | High et al. | 73/502 |

FOREIGN PATENTS

| 357,263 | 8/1922 | Germany | 73/514 |
|---|---|---|---|
| 433,306 | 8/1935 | Great Britain | 73/515 |

*Primary Examiner*—Richard C. Queisser
*Assistant Examiner*—Herbert Goldstein
*Attorneys*—C. Cornell Remsen, Jr., Walter J. Baum, Paul W. Hemminger, Percy Lantzy and Thomas E. Kristofferson ABSTRACT: An angular acceleration sensor of the fluid inertia type is shown. A rotor enclosed in a housing has a fluid filled circumferential spiral groove or canal of one or more turns, in which the fluid is constrained except at the ends of the canal where it may be applied to a differential pressure detector to obtain an analog of angular acceleration applied to the rotor shaft. Two ways are shown, for connecting the canal ends (which rotate themselves) to fixed outside connections through the housing by utilizing the rotor shaft collector ring grooves and ducts or divided clearance spaces between rotor and housing cavity.

PATENTED SEP 7 1971

3,603,158

*Inventor*
ERWIN SCHLITZ
By *William T. O'Neil*
*Agent*

ANGULAR ACCELERATION SENSOR

CROSS REFERENCE TO RELATED APPLICATIONS

This application is filed under the provisions of 35 U.S.C. 119 with claim for the benefit of the filing of an application covering the same invention filed Apr. 22, 1968, serial number P 17 55 285.1 in the Federal Republic of Germany.

BACKGROUND OF THE INVENTION

1. Field of the Invention

The invention relates to accelerometers, and more particularly to fluid inertia accelerometer sensors for measuring angular accelerations for inclusion in automotive antiskid-braking systems.

2. Description of The Prior Art

The invention was made primarily because of problems encountered in prior art antiskid-braking systems. Typically, such systems may be thought of as servomechanisms for modifying braking force as a function of angular wheel acceleration. Thus, when a skid occurs, wheel rotation is abruptly terminated. Obviously, this amounts to angular deceleration or negative acceleration, and accordingly is detectable by means of a device in accordance with the present invention.

Relatively sophisticated prior art arrangements are known whereby linear deceleration of a vehicle is compared with angular deceleration of a wheel, and braking controlled as some function of the difference. Simple systems are also extant, involving transducers with spring loaded rotational mass on wheel hubs, but usually these do not provide continuous control. Rather, they apply control at predetermined values of deceleration by closing switch contacts, or mechanically interrupting the braking pressure in some manner.

One common problem associated with the prior art systems, but solved by the invention, is the lack of sensors providing continuously generated acceleration analog signals. Another (and somewhat related) prior art problem is the delay in generating a control or corrective function so that a skid condition may have serious consequences before a corrective action takes effect.

The present invention is particularly adapted to continuous control, in that it would provide a continuous angular acceleration analog to a servomechanism input comprising, for example, a differential pressure measuring transducer in a manner which will be fully explained as this specification proceeds.

SUMMARY OF THE INVENTION

The dangers of wheel "lock-up" and the accompanying skid in vehicles are well-known in their effect on steering control, tire wear, and stopping distance, and need not be further discussed herein.

The actuation of vehicle brakes to produce negative acceleration of the vehicle is, of course, accompanied by a corresponding negative angular deceleration of the wheels. When a skid condition develops, one or more of the wheels of the vehicle is "locked-up" and has broken running surface traction. The "locked-up" wheel then slides with respect to the road, runway or rail as the case may be. The "lock-up" obviously produces a relatively abrupt change approaching a step function in the pattern of wheel deceleration. Since the wheel has a significant moment of inertia in the practical case, the actual end of wheel rotation at the inception of a skid occurs over a measurable period of time, long enough for the operation of a servomechanism (responsive to the measured deceleration) arranged to relieve brake pressure sufficiently to eliminate the skid and bring the wheel back into rotation or actually prevent the development of a skid by acting when the tendency to traction is first detected in accordance with the Accordingly, the desirability of an antiskid device employing the sensor of the present invention with its capability for continuously providing an analog of angular acceleration, will be realized.

According to the invention, a rotor adapted to be joined to a rotating wheel hub is provided, and contains a peripheral canal which is preferably a multiturn spiral groove (not unlike a square thread groove) with an overfitted sleeve so that the canal is fluidtight.

At the canal extremities, bores are provided to connect the canal at each end to an external utilization device. Since the rotor is enclosed in a two-piece housing, the housing itself cooperates in providing "slip ring" collection chambers. In one embodiment, these comprise a pair of circumferential ring grooves is emplaced in the housing against the shaft within its bearing area. A pair of ducts through the body of the rotor and the shaft open, each opposite a corresponding one of said connection chambers. In another embodiment the clearance volume between the rotor and the interior cavity of the housing is split circumferentially into two chambers, whereby said ducts are each directed only through the rotor body to join a corresponding part of said split clearance volume. Thus a "slip ring" type of arrangement is provided, and in either embodiment the collection chambers are readily ducted to external connections through the walls of the housing.

It will be realized that a liquid medium retained within the described grooves and ducts is free to respond inertially to acceleration couples applied at the shaft input. The effect of the acceleration couple on the retained liquid is to produce a differential pressure as measurable between the two duct inputs. Said differential pressure is of sense corresponding to the sense of the acceleration couple. Since the device does not depend upon flow of the liquid inertial medium, fluid friction within the ducts and grooves is not a factor and there are no other basic accuracy limiting factors.

The preferred liquid medium contemplated is hydraulic oil, however other liquids, including mercury, are adapted to use in the device of the invention. Since the differential pressure is directly proportional to the mass of the liquid medium, as well as to the total length of the canal spiral, it is obvious that engineering latitude is available in designing the device to operate with a selected differential pressure transducer.

DESCRIPTION OF THE PREFERRED EMBODIMENT

Figure 1:
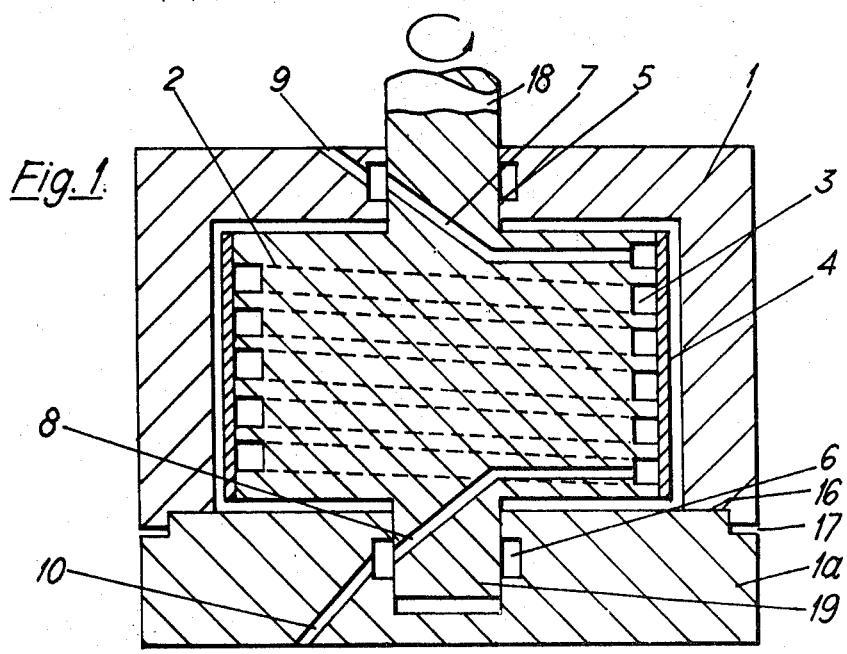
FIG. 1 illustrates a sectional view of a typical embodiment of the present invention, the sectioning plane having been oriented to contain the axial centerline of the view.

Referring now to FIG. 1, it will be noted that a rotor 2 is mounted with rotational freedom in the housing or casing 1 of the sensor, the shaft end 18 protruding through the housing and the shaft end 19 nesting in a bearing cavity in 1a. The part 1a is an attached separate part of 1 with attachment means presumed at 16, and a gasket groove being provided at 17. On the circumference of the rotor 2, a spiral groove pressure canal 3 is provided. This groove, which is not unlike a square or acme thread groove, is readily provided by a lathe or milling operation. The bores 7 and 8 connect the spiral pressure canal 3 with the corresponding ring groove chambers 5 and 6, respectively.

The inlet and outlet of the pressure medium for transmission of the pressure change to a differential pressure transducer are provided by the bores 9 and 10 respectively connected to the bores 7 and 8 through "slip ring" chambers 5 and 6, respectively.

If the rotor 2 is rotated at constant angular velocity, the pressure medium in the chambers 5 and 6 and the bores 7 and 8 and the canal 3 are in a pressure equalization condition. If the rotor 2 is accelerated, for example, in the direction of the arrow, the pressure in chamber 6 increases in relation to chamber 5 in consequence of the inertia of the pressure medium being retained in the pressure canal 3. This pressure depends among other factors, on the length of the spiral-shaped pressure canal 3 and on the angular acceleration or deceleration. The differential pressure change between 9 and 10 as a result of acceleration, are transmitted through the bore 10 to the hydraulic or pneumatic-braking system to effect the desired regulation through a suitable servomechanism.

The main differences in the device of FIG. 2, as compared to FIG. 1, are as follows: Ducts 11 and 12 provide small connection bores between the pressure canal 3 and chamber 15 existing as a clearance around the rotor.

Figure 2:
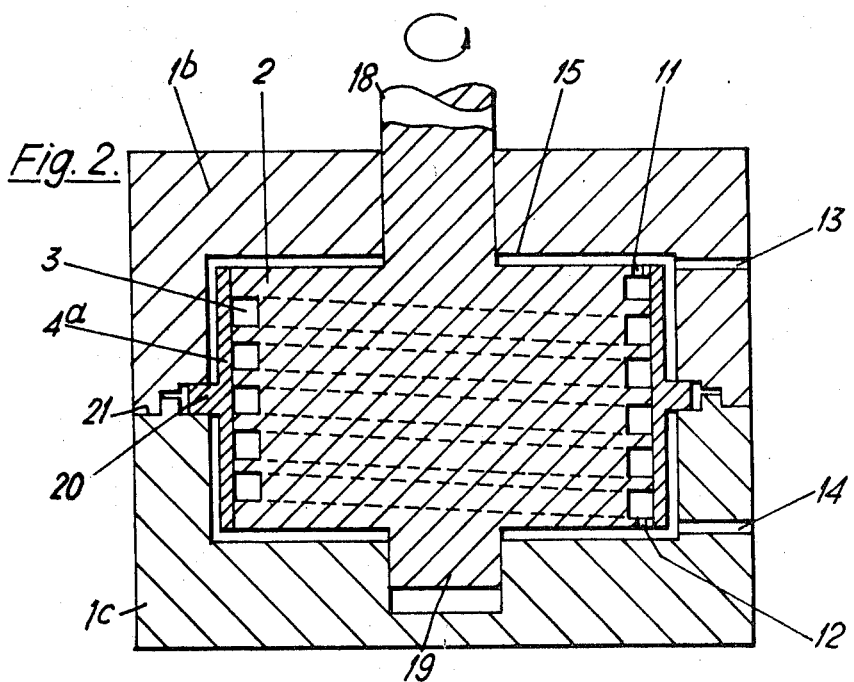
FIG. 2 illustrates a similarly sectioned view of an alternative embodiment of the present invention.

The said clearance chamber is divided into two volumes above (as seen in FIG. 2) and below a divider ring 20 which is a part of sleeve 4a. The duct 11 connects to the upper portion of 15, whereas 12 connects to the lower half of 15.

Returning to FIG. 1, it will be noted that a sleeve 4 is fitted, fluidtight, over the cylindrical surface of rotor 2 and acts to make a closed canal of the spiral groove 3. This construction provides an easy and inexpensive method of forming the canal.

In FIG. 2, it will be noted that the housing 1b has a mating part 1c which joins and is secured at 21. The sleeve 4a differs from 4 of FIG. 1 substantially only in respect to the peripheral band 21, which works against relatively low friction seals outwardly from 20, thereby providing the two fluid collection chambers as aforementioned. Ducts 11 and 12 will be seen to provide communication to 13 and 14, respectively, through the said collection chambers in the rotor to housing clearance. Duct 13 and 14 then provide connections for differential pressure measurement as did 9 and 10 in FIG. 1.

Elements 2, 3, 18 and 19 on FIG. 2 correspond directly to the same elements in FIG. 1.

While it would be normal to fabricate the main elements of the invention from common metals, there is obviously considerable freedom of choice in this regard. Certain plastics, for example, could be used for some or all of the parts.

I claim:

1. An angular acceleration sensor comprising:
   a housing having an interior cylindrical cavity and an axially concentric shaft bore through said housing;
   a rotor emplaced within said cylindrical cavity, said rotor having an axial shaft affixed thereto, said shaft protruding through said bore on one end and nested in a bearing cavity in said housing at the other end;
   at least one circumferential spiral canal, said canal lying around a cylindrical plane at a predetermined diameter within the surface of said rotor;
   means comprising, for each end of said canals
      a chamber in the shape of a volume of revolution external to said rotor, and
      a first duct within said rotor leading to said chamber external to said rotor and in communication therewith at all angles of rotation of said rotor; and
   second duct means providing ducting within said housing leading from said chamber externally of said housing, for each of said ends of said canal, whereby fluid may be constrained within a closed circuit terminating at the ends of said second duct means for connection to a differential pressure sensing device;
   said canal comprising
      a plurality of circumferential turns;
   said rotor comprising
      a central core containing said axial shaft;
   said canal includes
      a spiral groove into the outer perimeter of said core;
   further including
      a sleeve encircling the outer perimeter of said core affixed in a fluidtight manner; and wherein
   said chambers each comprise
      a portion of the volume between said rotor and said housing;
   said sleeve includes
      a circumferential projection in the form of a central portion of outside diameter large compared to the outside diameter of said sleeve; and
   said housing is indented to receive said projection thereby to divide said volume between said rotor and said housing into said two chambers.